United States Patent [19]
Olsson

[11] Patent Number: 5,949,300
[45] Date of Patent: Sep. 7, 1999

[54] LINE COUPLER

[76] Inventor: Stellan Olsson, Dr-Fitz-Str. 10, 91781 Weissenburg, Germany

[21] Appl. No.: 08/855,758

[22] Filed: Feb. 21, 1997

[30] Foreign Application Priority Data

Mar. 1, 1996 [DE] Germany .......................... 196 07 971

[51] Int. Cl.$^6$ ..................................................... H03H 7/48
[52] U.S. Cl. .......................... 333/100; 333/124; 333/131; 336/107
[58] Field of Search ..................................... 333/100, 124, 333/131; 336/107; 439/189; 375/219; 455/3.1, 6.1

[56] References Cited

U.S. PATENT DOCUMENTS

| 4,038,601 | 7/1977 | Laborie et al. ....................... 333/131 X |
| 4,694,241 | 9/1987 | Genuit ................................ 336/107 X |
| 5,309,123 | 5/1994 | Gelin ........................................ 333/124 |

FOREIGN PATENT DOCUMENTS

| 0 297 865 | 1/1989 | European Pat. Off. . |
| 0 448 230 | 9/1991 | European Pat. Off. . |
| 0 482 973 | 4/1992 | European Pat. Off. . |
| 503 170 | 9/1992 | European Pat. Off. . |
| 2 271 888 | 4/1994 | United Kingdom . |

OTHER PUBLICATIONS

B. Wiemann et al. "rpt–Seminar Bussysteme," in: Regelungstech–nische Praxis Oct. 1983, vol. 10, pp. 61–64.
B. Wiemann et al. "rpt–Seminar Bussysteme," in: Regelungstech–nische Praxis Oct. 1983, vol. 11, pp. 69–70.
D.R. Snyder "Control MIL–STD–1553 with Remote Terminal Chips," IEEE Trans, Aug. 6, 1987, pp. 109–112, 114.
K. H. Lee et al. "New Date Bus Interface Technique" IEEE Trans, May 1985, pp. 379–384.

*Primary Examiner*—Paul Gensler
*Attorney, Agent, or Firm*—Gary A. Samuels

[57] ABSTRACT

A line coupler is provided having a bus line piece, at least one transformer, two electrically shielded housings and a coupling site. The transformer is equipped with two primary and two secondary winding terminals. The two primary winding terminals are connected to the pair of coupling elements located at the coupling site. Each coupling element is connected to one of the bus line wires contained in the bus line piece. The secondary winding terminals are connected to branch line wires, which are brought out from the secondary electrical shielded housing. The two electrically shielded housings are electrically connected to each other by two connectors, these connectors also allow the two housings to be releasably connected.

7 Claims, 2 Drawing Sheets

LINE COUPLER

FIELD OF THE INVENTION

This invention generally relates to line couplers. More particularly, the present invention relates to a line coupler for coupling a branch line to a line, as well as to a line provided with at least one such line coupler. The line coupler of the present invention can be a data bus coupler which connects remote devices, or other electrical equipment, to a bus system.

BACKGROUND OF THE INVENTION

One type of a conventional data bus coupler design corresponds to military standard MIL-STD-1553B. Such a design is shown and referred to in FIG. 3 and is comprised of an electrically shielded housing 11, through which a bus line piece 13 is passed. The bus line piece 13 has a first bus line wire 15 and a second bus line wire 17. A data bus connector 19 or 21 is connected to each end of the bus line piece 13. The data bus connector 19 or 21 enables the bus line piece 13 to be releasably connected to a bus line (not shown). A transformer 23 having a primary winding 25 and a secondary winding 27 is also situated in housing 11. The two terminals of primary winding 25 are connected via two coupling resistance elements 29 and 31 to the first bus line wire 15, or to the second bus line wire 17. The two terminals of the secondary winding 27 are connected to a branch line connector 33, which serves to connect a branch line (not shown) to the secondary winding 27 of transformer 23.

A coupler housing 11 may comprise several data line couplers each with a coupling resistance pair and a transformer. This is shown in FIG. 3 by a second data bus coupler indicated by dashed lines.

The coupling resistance elements 29 and 31 are provided to protect the two bus lines wires 15 and 17 from a direct short circuit. This series circuit from the two coupling resistance elements 29, 31, and the primary winding 25 connected between the two bus line wires 15 and 17, represents a load for the bus line 13. Such a load causes a disturbance in the characteristic impedance of the bus line 13, which in turn increases with the length of the branch line to be connected via the coupler to the two bus line wires 15 and 17. As may be appreciated by one skilled in the art, when a number of such data bus couplers are connected to the bus line 13, the resulting total load and resulting total characteristic impedance mismatch may cause a significant adverse effect on the electrical behavior of a bus line system.

In designing a bus line system for an aircraft, for example, it is desirable to incorporate the largest possible number of reserve couplers in the data bus system so that additional remote devices can be connected to the data bus system at a future time. However, to minimize the total load and total characteristic impedance mismatch for such a bus line system, reserve couplers are not provided in a bus line system unless absolutely required.

The foregoing illustrates limitations known to exist in present line couplers. Thus, it is apparent that it would be advantageous to provide an improved line coupler directed to overcoming one or more of the limitations set forth above. Accordingly, a suitable alternative is provided including features more fully disclosed hereinafter.

SUMMARY OF THE INVENTION

The present invention advances the art of line couplers, beyond which is known to date. In one aspect of the present invention, a line coupler is provided having a bus line piece, at least one transformer, two electrically shielded housings and a coupling site. The transformer is equipped with two primary and two secondary winding terminals. The two primary winding terminals are connected to the pair of coupling elements located at the coupling site. Each coupling element is connected to one of the bus line wires which are contained in the bus line piece. The secondary winding terminals are connected to branch line wires, which are brought out from the secondary electrical shielded housing. The two electrically shielded housings are electrically connected to each other by two connectors, which allow the two housings to be releasably connected.

In another embodiment of the invention, multiple pairs of coupling elements are presented, each pair of coupling elements being attached to one transformer. In this embodiment, each transformer is housed in a separate electrically shielded housing while all of the pairs of coupling elements can be housed in the one electrically shielded housing.

BRIEF DESCRIPTION OF THE DRAWINGS

The foregoing summary, as well as the following detailed description of preferred embodiments of the invention, will be better understood when read in conjunction with the appended drawings. For purposes of illustrating the invention, there is shown in the drawings two embodiments which are presently preferred. It should be understood, however, that the invention is not limited to the precise arrangement and instrumentality shown. In the drawings.

DETAILED DESCRIPTION OF THE INVENTION

Figure 1:
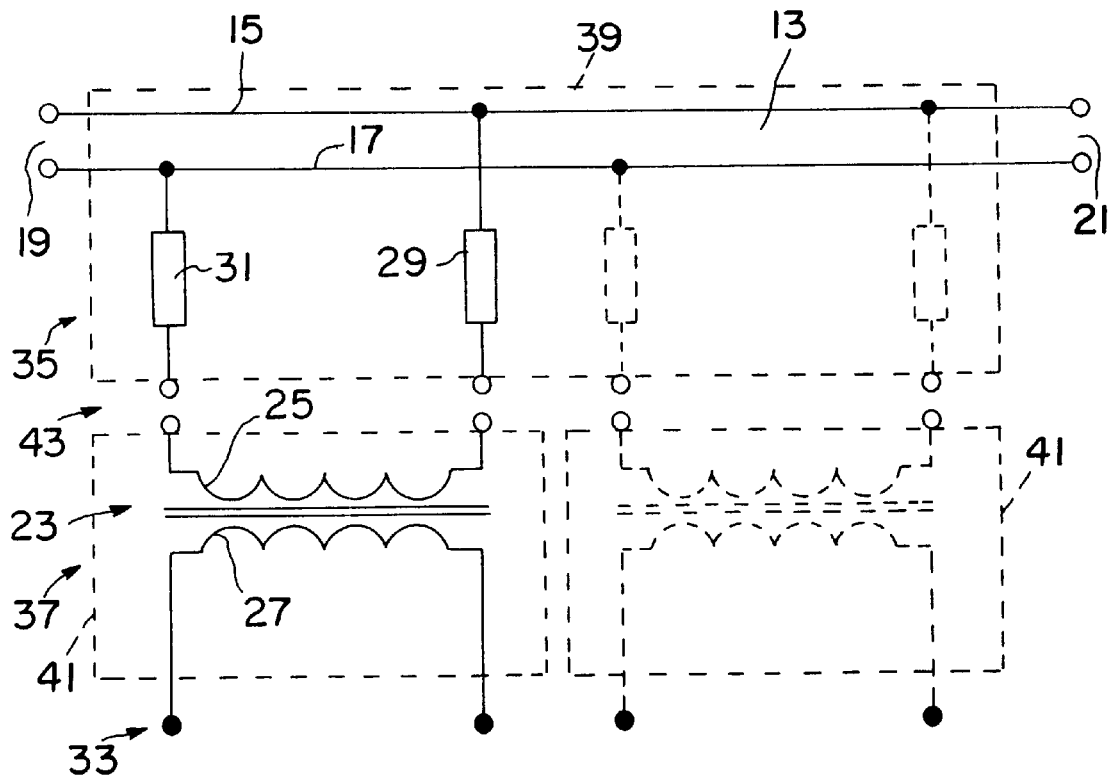
FIG. 1 is a schematic circuit diagram of one embodiment of a line coupler according to the present invention.
Figure 3:
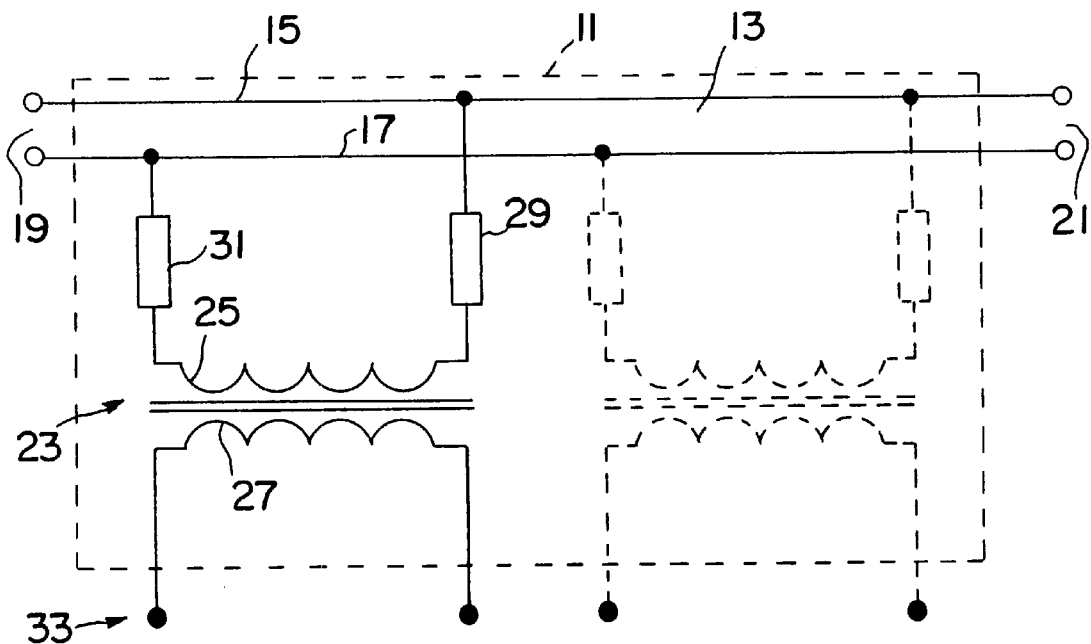
FIG. 3 is a schematic circuit diagram of a prior art line coupler.
Figure 2:
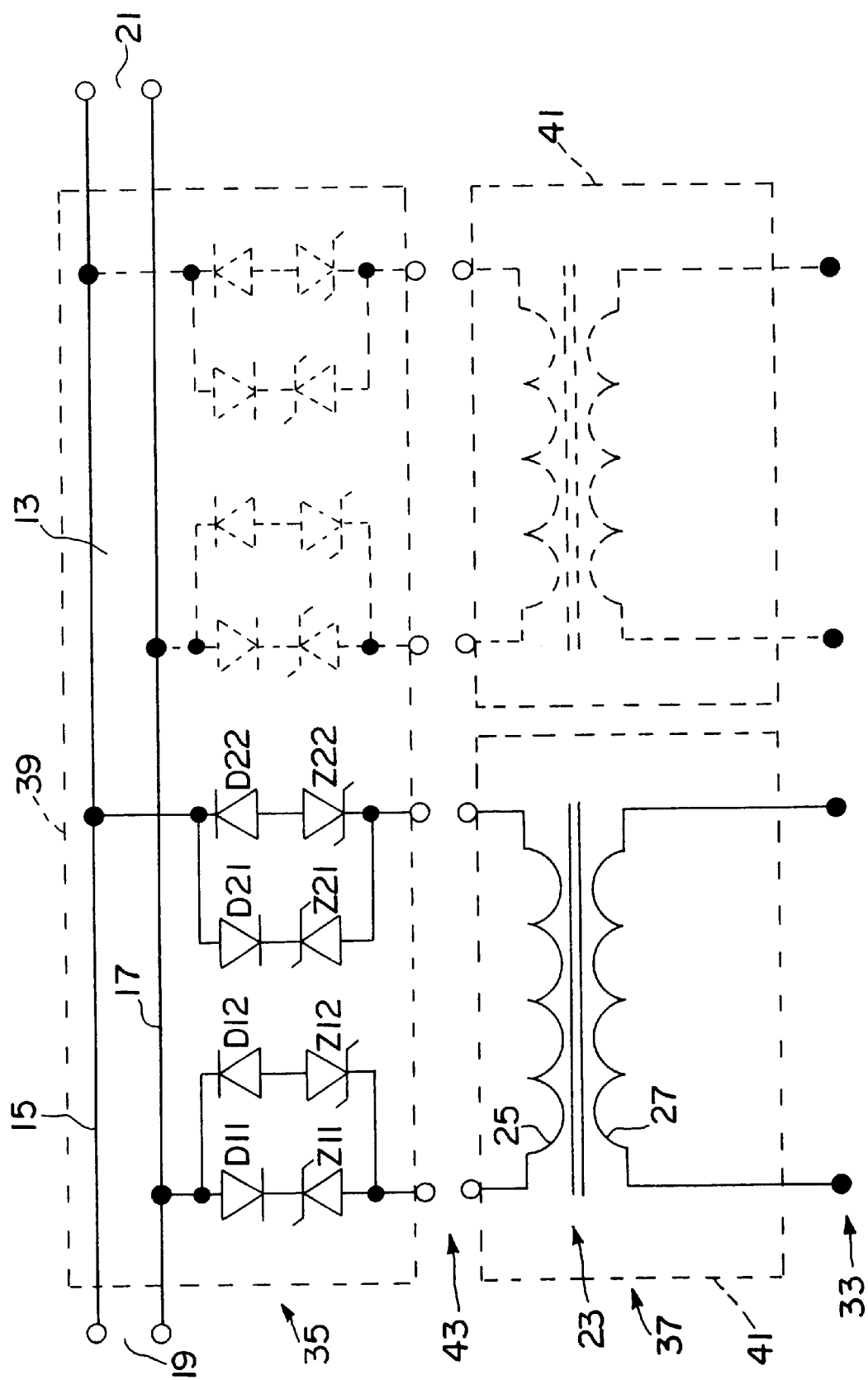
FIG. 2 is a schematic circuit diagram of a second embodiment of a line coupler according to the present invention.

In FIGS. 1 and 2, circuit components that correspond to the circuit components of the data bus coupler shown in FIG. 3 are marked with the same reference numbers and are not further explained in connection with the line coupler of the present invention. Accordingly, the preceding explanations for FIG. 3 will be referred to.

FIG. 1 illustrates a first embodiment of a line coupler according to the present invention, wherein coupling elements 29 and 31 are formed by ohmic resistances. The departure of the embodiment of the line coupler of the present invention shown in FIG. 1, from the known data bus coupler according to FIG. 3, consists of the fact that each line coupler is divided into a first coupler half 35 and a second coupler half 37. The first coupler half 35 includes a bus line piece 13 having two bus line wires 15 and 17, and a pair of coupling elements 29 and 31 which are rigidly connected to the two bus line wires 15 and 17.

The second coupler half 37 includes a transformer 23 containing both the primary winding 25 and the secondary winding 27. Both coupler halves 35 and 37 are accommodated in separate shielded housings, wherein the first coupler half 35 is contained in a first housing 39 and the second coupler half 37 is contained in a second housing 41. A connector device 43 is situated between the two coupler halves 35 and 37. Connector device 43 releasably connects halves 35 and 37. One of the two connectors forming the connector device 43 is situated on each of the two housings 39 and 41. The connectors of connector device 43 therefore form the interface between the two coupler halves 35 and 37. The expedient of arranging the coupling elements 29 and 31 between the connector device 43 and the two bus line wires 15 and 17 prevents a short circuit of the two bus line wires when the two contacts, of the connector device 43, are short circuited for any reason. If such short-circuit bridging of these two contacts of the connector device 43 occurs, the two bus line wires 15 and 17 are protected from a direct short circuit by the coupling elements 29 and 31.

The branch line which connects to the secondary winding 27 of transformer 23 by means of branch line connector 33, can be a twin axial cable or a triaxial cable. The type of branch line connector 33 depends on the type of cable used for the branch line. For example, a triaxial plug-in connector is used when a coaxial plug-in connector with additional outer shield is involved. The same comments apply with respect to the bus line and thus the bus line piece 13 of the line coupler and the data bus connectors 19 and 21.

It should be noted that any type of connector in which the two coupling resistances 29 and 31 can be electrically connected in appropriate fashion to the two terminals of primary coil 25 of transformer 23, on the one hand, and the two shielded houses 39 and 41, on the other, can be used for the connector device 43.

In the variant of the invention shown in FIG. 1 several coupler halves can be accommodated in the first housing 39. Several second housings 41, each with a transformer 23, are accordingly connectable to a corresponding number of connector devices 43 to the first housing 39. This is indicated in FIG. 1 by the coupler halves of a second data bus coupler shown by dashed lines. The two housings 39 and 41 are then advantageously electrically connected via this connector device 43 in order to extend the shielding action over the entire line conductor without a gap.

It should be understood that connection of the bus line piece 13 to the bus line of the bus line system and connection of the second coupler half 37 to the branch line would occur via a plug-in connector. However, there is also a possibility of eliminating at least one part of the connectors 19 and 21 and passing the bus line without interruption to the first housing 39 or connecting the branch line rigidly to the two terminals of the secondary winding 27 of transformer 23.

The branch lines are formed by cable pieces whose length depends on the distance of the individual data terminals from the bus line and can amount to, for example, ten meters. Such data terminals include computers, microcomputers or processors that are combined via the bus line system into a LAN system (local area network). The invention also makes available a signal transmission line equipped with at least one line coupler.

FIG. 1 further illustrates that the line 13 having the first coupler half 35 is provided with two or more coupling sites, each coupling site containing a pair of coupling elements 29 and 31. These coupling sites are initially provided only as reserve coupling sites wherein the second coupler half 37 does not have to be present at these reserve coupling sites. The ends of the coupling elements facing away from the two bus line wires 15 and 17 are thus open at these reserve coupler sites. The coupling elements 29 and 31 are therefore functionless and cause no change in characteristic impedance of the line 13. Nor does a load on line 13 exist at these reserve coupler sites, since the coupling elements remain open on one side.

Since the second coupler halves 37 comprising the transformer 23 are not connected to the reserve coupling sites, assembly of the line system with transformers at sites where they are not used is avoided. This offers cost advantages because only the actual coupling sites are assembled with transformers. This can then also offer an advantage from the standpoint of weight saving if, for example, many reserve coupling sites are provided in an aircraft that initially are not utilized, since transformers are comparatively heavy circuit components.

Several line couplers can be accommodated in one coupler housing, for example, up to 32. In this case, the coupling elements 29 and 31 of all coupling and reserve coupling sites are accommodated in the first shielded housing 39. The transformers 23 of the second coupler halves 37 are accommodated in a separate second housing 41. As many connector devices 43 as coupling sites are provided on the first housing 39. The line can be closed by means of one or two characteristic impedance-matched resistances within the first shielded housing 39. In one variant of the invention the coupling elements 29 and 31 are each formed by one electrical resistance. Based on the cited MIL standard the coupling resistances each have a resistance value of 0.75 $Z_0$ at a characteristic impedance $Z_0=78$ and the transformer has a primary side-secondary side voltage ratio of 1:2.

FIG. 2 shows a second variant of a line coupler according to the invention whose coupling elements 29 and 31 have two antiparallel-connected zener diodes (D11, D12, D21, D22, Z11, Z12, Z21, Z22). Voltage transfer from one line via two zener diodes on the primary side 25 of the transformer 23 to the other line therefore only occurs above a voltage value equal to the sum of the zener voltages of the two zener diodes. Protection against a direct short circuit between the two lines is therefore offered via the primary side 25 of the transformer 23.

Each of these coupling networks consists of a parallel circuit of two series circuits each with one diode and one zener diode. The line coupler in FIG. 2 is depicted with solid lines. The coupling network connected to bus line 17 has in the left circuit branch a series circuit consisting of diode D11 and zener diode Z11 and in the right circuit branch a series circuit consisting of diode D12 and zener diode Z12. The two zener diodes Z11 and Z12 are connected antiparallel, i.e., Z11 faces bus line 17 with the cathode, whereas the cathode of Z12 faces the connector device 43. The two diodes D11 and D12 are connected antiparallel to each other and anti-series relative to the corresponding zener diodes Z11 and Z12. This means the anode of D11 faces bus line 17, whereas the cathode of D12 faces bus line 17 and in the left circuit branch D11 and Z11 have a cathode-to-cathode connection, whereas in the right circuit branch Z11 and Z12 have an anode-to-anode connection. This cathode-to-cathode and anode-to-anode connection prevents the voltage of a charged depletion layer capacitor of one zener diode from reaching a signal line of the line coupler.

The coupling network connected to line 15 is constructed identically with a diode D21 and a zener diode Z21 in the left circuit branch and a diode D22 and a zener diode Z22 in the right circuit branch.

If, for example, one initially assumes that the zener diodes each have a zener voltage of 3.4 V, only voltages with voltage values of about 6.8 V are transferred between the two bus lines 15 and 17 via the primary side 25 of transformer 23. A direct short circuit between the two bus lines 15 and 17 is thus prevented via transformer 23.

A significant improvement was devised by a technically inexpensive expedient, namely the connector device between coupling elements 29 and 31 or D11 to D22 and Z11 to Z22, on the one hand, and transformer 23, on the other. Neither a load nor an adverse effect on characteristic impedance is created for the bus line at reserve coupling sites where no branch line is initially connected. In addition, provision of transformers that initially are still not required is not necessary.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A line coupler comprising:
    a branch line having two branch line wires for connection to remote devices;
    a bus line having two bus line wires for carrying signals to the remote devices;
    at least one transformer having a primary winding and a secondary winding, said primary winding having two primary winding terminals, and said secondary winding having two secondary winding terminals, one of the secondary winding terminals being connected to one branch line and the other secondary winding terminal being connected to the other branch line;
    at least one coupling site adapted to be connected to said at least one transformer, said coupling site having at least one pair of first and second individual coupling elements, the first individual coupling element being rigidly connected to one of the two bus line wires and the second individual coupling element being rigidly connected to the other of the two bus line wires, at least one of said first individual coupling element or said second individual coupling element being formed by a resistance component; and
    at least one connector device that releasably connects each said primary winding terminals to said pair of first and second individual coupling elements.

2. The line coupler as set forth in claim 1 further comprising:
    a primary electrically shielded housing encompassing a bus line piece having said bus line having two bus line wires and said coupling site;
    at least one secondary electrically shielded housing encompassing one of at least one transformer; and
    said connector device electrically connecting the first electrically shielded housing and said secondary electrically shielded housing.

3. The line coupler as set forth in claim 2, said bus line wires each having two ends, an internal bus line piece, and an external bus line piece, wherein said internal bus line piece is encompassed in said first electrically shielded housing and said external bus line piece is situated outside of said first electrically shielded housing, said line coupler further comprising two pair of line connectors attaching to said ends of said bus line wires, said line connectors releasably switching in series said internal bus line piece with the external conductors.

4. The line coupler as set forth in claim 2, the first individual coupling element and the second individual coupling element containing first and second antiparallel connected zener diodes.

5. The line coupler as set forth in claim 1 wherein the bus line has a characteristic impedance, said two bus line wires being protected from a short-circuit by a resistance bridging the two line wires with a resistance value corresponding to the characteristic impedance of the bus line.

6. A line coupler comprising:
    a bus line piece having a bus line with two line wires for carrying signals to remote devices;
    a primary housing having at least one coupling site, said primary housing encompassing a portion of the bus line piece, said coupling site of the primary housing having at least one pair of first and second individual coupling elements, the first individual coupling element being connected to one of the two line wires and the second individual coupling element being connected to the other of the two bus line wires, at least one of said first individual coupling element or said second individual coupling element being formed by a resistance component;
    a branch line having two branch line wires for connection to the remote devices;
    a transformer having a primary winding and a secondary winding, said primary winding having two primary winding terminals, and said secondary winding having two secondary winding terminals, one of the secondary winding terminals being connected to one branch line and the other secondary winding terminal being connected to the other branch line, said transformer being adapted to be connected to said coupling site of the primary housing;
    a secondary housing encompassing said transformer; and
    at least one connector device that releasably connects each said primary winding terminals to said first and second individual coupling elements for attaching the primary housing to the secondary housing.

7. The line coupler as set forth in claim 6, said bus line wires each having two ends, an internal line piece, and an external line piece, wherein said internal line piece is encompassed in said first electrically shielded housing and said external line piece situated outside of said first electrically shielded housing, said line coupler further comprising two pair of line connectors attaching to said ends of said line wires, said line connectors releasably switching in series said internal line piece with the external conductors.

\* \* \* \* \*